US009073195B2

(12) United States Patent
Kaye, Jr. et al.

(10) Patent No.: US 9,073,195 B2
(45) Date of Patent: Jul. 7, 2015

(54) UNIVERSAL ACCESSORY FOR OSCILLATING POWER TOOL

(75) Inventors: Thomas R. Kaye, Jr., Fallston, MD (US); James R. Niblett, Ellicott City, MD (US)

(73) Assignee: Black & Decker Inc., Newark, DE (US)

( * ) Notice: Subject to any disclaimer, the term of this patent is extended or adjusted under 35 U.S.C. 154(b) by 444 days.

(21) Appl. No.: 13/385,614

(22) Filed: Jul. 16, 2012

(65) Prior Publication Data
US 2014/0035242 A1 Feb. 6, 2014

(51) Int. Cl.
*B24B 23/04* (2006.01)
*B27B 5/30* (2006.01)
*B25F 3/00* (2006.01)
(Continued)

(52) U.S. Cl.
CPC . *B25F 3/00* (2013.01); *B23B 31/10* (2013.01); *B27B 5/30* (2013.01); *B24B 23/04* (2013.01); *B27B 19/006* (2013.01); *Y10T 279/33* (2015.01); *Y10T 403/7062* (2015.01); *Y10T 279/3406* (2015.01); *Y10T 83/9457* (2015.04); *Y10T 83/7045* (2015.04); *Y10T 83/9319* (2015.04); *B23B 31/19* (2013.01); *B25F 5/00* (2013.01); *B24B 23/005* (2013.01); *B27B 5/32* (2013.01); *B23D 61/006* (2013.01)

(58) Field of Classification Search
CPC ........ B23B 31/10; B23B 31/19; B24B 23/04; B25F 3/00; B25F 5/00; B27B 5/30; B27B 19/006
USPC .................... 279/141, 143–145; 30/329–331, 30/337–339; 83/597, 698.11, 782, 835; 451/356, 357, 359; D8/20, 71; D24/146; 606/79, 82

IPC .................................... B24B 23/04; B27B 5/30
See application file for complete search history.

(56) References Cited

U.S. PATENT DOCUMENTS 2,305,465 A 12/1942 Bangser
D137,633 S 4/1944 Jacobson
(Continued)

FOREIGN PATENT DOCUMENTS

AU 2006305634 4/2007
CH 657411 A5 8/1986
(Continued)

OTHER PUBLICATIONS

Zimmer Inc., Brochure "Air Drive Blades—The Next Generation" dated Jun. 28, 1993, 1 page; © 1993 Zimmer, Inc.
(Continued)

*Primary Examiner* — Eric A Gates
(74) *Attorney, Agent, or Firm* — Scott B. Markow (57) ABSTRACT

A combination kit includes an oscillating power tool and accessory. The tool includes a housing, motor, transmission to convert rotational motion to oscillating motion, output spindle, and accessory attachment mechanism. The mechanism has a first clamping face with projections, a second clamping face, and a central post. The accessory includes a working end, an opposite rear end, and a fitment adjacent the rear end. The fitment includes a generally U-shaped opening open at the rear end that receives the post, a first plurality of openings in communication with and extending radially outward from the U-shaped opening, and a second plurality of openings not in communication with and positioned radially outward from the U-shaped opening.

20 Claims, 6 Drawing Sheets (51) Int. Cl.
  *B23B 31/10* (2006.01)
  *B27B 19/00* (2006.01)
  *B23B 31/19* (2006.01)
  *B25F 5/00* (2006.01)
  *B24B 23/00* (2006.01)
  *B27B 5/32* (2006.01)
  *B23D 61/00* (2006.01)

(56) References Cited

U.S. PATENT DOCUMENTS

| | | |
|---|---|---|
| 2,693,365 A | 11/1954 | Zelewsky |
| 2,785,515 A | 3/1957 | Sansig |
| 2,997,819 A | 8/1961 | Schact |
| 3,055,497 A | 9/1962 | Klonski |
| 3,440,915 A | 4/1969 | Weyant |
| 3,554,197 A | 1/1971 | Dobbie |
| 3,656,393 A | 4/1972 | Goellner |
| 3,905,374 A | 9/1975 | Winter |
| 3,943,934 A | 3/1976 | Bent |
| 4,015,371 A | 4/1977 | Grayston |
| 4,059,930 A | 11/1977 | Alessio |
| 4,106,181 A * | 8/1978 | Mattchen .................. 29/450 |
| 4,112,541 A | 9/1978 | Tetradis |
| 4,252,121 A | 2/1981 | Arnegger |
| 4,253,776 A | 3/1981 | Orain |
| 4,265,285 A | 5/1981 | Fodor |
| 4,386,609 A | 6/1983 | Mongeon |
| 4,393,626 A | 7/1983 | Schroer |
| 4,513,742 A | 4/1985 | Arnegger |
| 4,590,837 A | 5/1986 | Nanba |
| 4,597,227 A | 7/1986 | Gentischer et al. |
| 4,599,077 A | 7/1986 | Vuillard |
| 4,648,735 A | 3/1987 | Oddenino |
| 4,700,478 A | 10/1987 | Mezger et al. |
| 4,784,034 A | 11/1988 | Stones et al. |
| 4,825,091 A | 4/1989 | Breyer et al. |
| 4,891,884 A | 1/1990 | Torbet |
| RE33,335 E | 9/1990 | Gentischer et al. |
| 4,980,976 A | 1/1991 | Junginger et al. |
| 4,989,374 A | 2/1991 | Rudolf et al. |
| 5,022,188 A | 6/1991 | Borst |
| 5,027,684 A | 7/1991 | Neukam |
| 5,038,478 A | 8/1991 | Mezger et al. |
| 5,064,325 A | 11/1991 | McRoskey |
| 5,085,589 A | 2/1992 | Kan |
| 5,107,737 A | 4/1992 | Tagliaferri |
| 5,122,142 A | 6/1992 | Pascaloff |
| 5,157,873 A | 10/1992 | Rudolf et al. |
| 5,199,223 A | 4/1993 | Rudolf et al. |
| 5,219,378 A | 6/1993 | Arnold |
| 5,235,719 A | 8/1993 | Wimberley |
| 5,263,283 A | 11/1993 | Rudolf et al. |
| 5,265,343 A | 11/1993 | Pascaloff |
| 5,269,784 A | 12/1993 | Mast |
| D343,247 S | 1/1994 | Walen |
| 5,303,688 A | 4/1994 | Chiuminatta et al. |
| 5,306,025 A | 4/1994 | Langhoff |
| 5,306,285 A | 4/1994 | Miller et al. |
| 5,309,805 A | 5/1994 | Mezger et al. |
| 5,352,229 A | 10/1994 | Goble et al. |
| 5,366,312 A | 11/1994 | Raines |
| 5,382,249 A | 1/1995 | Fletcher |
| 5,423,825 A | 6/1995 | Levine |
| 5,435,063 A | 7/1995 | Russo |
| D360,946 S | 8/1995 | Goris |
| 5,440,811 A | 8/1995 | Challis |
| D362,065 S * | 9/1995 | Goris ................... D24/146 |
| 5,468,247 A | 11/1995 | Matthai et al. |
| 5,480,507 A | 1/1996 | Arnold |
| 5,489,285 A | 2/1996 | Goris |
| 5,496,316 A | 3/1996 | Goris |
| D368,777 S | 4/1996 | Goble et al. |
| 5,507,763 A | 4/1996 | Petersen et al. |
| D374,286 S | 10/1996 | Goble et al. |
| D374,287 S | 10/1996 | Goble et al. |
| D374,482 S | 10/1996 | Goble et al. |
| 5,658,304 A | 8/1997 | Lim |
| 5,676,680 A | 10/1997 | Lim |
| 5,694,693 A | 12/1997 | Hutchins et al. |
| 5,702,415 A | 12/1997 | Matthai et al. |
| 5,729,904 A | 3/1998 | Trott |
| 5,735,866 A * | 4/1998 | Adams et al. .................. 606/178 |
| D394,315 S | 5/1998 | Fisher |
| 5,785,571 A | 7/1998 | Camp |
| 5,829,931 A | 11/1998 | Doumani |
| 5,839,196 A | 11/1998 | Trott |
| 5,848,473 A | 12/1998 | Brandenburg, Jr. |
| D404,485 S | 1/1999 | Hutchins et al. |
| 5,857,237 A | 1/1999 | Dranginis |
| D405,177 S | 2/1999 | Hutchins et al. |
| D406,223 S | 3/1999 | Tran |
| 5,957,469 A | 9/1999 | Miles et al. |
| 6,022,353 A | 2/2000 | Fletcher et al. |
| 6,073,939 A | 6/2000 | Steadings et al. |
| 6,082,515 A | 7/2000 | Oono et al. |
| 6,099,397 A | 8/2000 | Wurst |
| 6,116,996 A | 9/2000 | Yanase |
| 6,132,282 A | 10/2000 | Camp |
| 6,132,300 A | 10/2000 | Martin |
| 6,179,301 B1 | 1/2001 | Steadings et al. |
| 6,196,554 B1 | 3/2001 | Gaddis et al. |
| 6,241,259 B1 | 6/2001 | Gaddis et al. |
| 6,340,022 B1 | 1/2002 | Schroer |
| D459,805 S | 7/2002 | Pascaloff |
| 6,430,465 B2 | 8/2002 | Cutler |
| 6,434,835 B1 | 8/2002 | Grunikiewicz et al. |
| 6,435,521 B2 | 8/2002 | Steadings et al. |
| D462,766 S | 9/2002 | Jacobs et al. |
| 6,488,287 B2 | 12/2002 | Gaddis et al. |
| 6,499,381 B2 | 12/2002 | Ladish et al. |
| 6,503,253 B1 | 1/2003 | Fletcher et al. |
| 6,536,536 B1 | 3/2003 | Gass et al. |
| 6,569,001 B2 | 5/2003 | Rudolf et al. |
| 6,629,484 B2 | 10/2003 | Soyama et al. |
| 6,678,062 B2 | 1/2004 | Haugen et al. |
| 6,705,807 B1 | 3/2004 | Rudolph et al. |
| 6,723,101 B2 | 4/2004 | Fletcher et al. |
| D489,823 S | 5/2004 | Fisher et al. |
| 6,747,745 B2 | 6/2004 | Ishikawa et al. |
| 6,796,888 B2 | 9/2004 | Jasch |
| 6,802,764 B2 | 10/2004 | Besch |
| 6,832,764 B2 | 12/2004 | Steadings et al. |
| 6,834,730 B2 | 12/2004 | Gass et al. |
| 6,865,813 B2 | 3/2005 | Pollak |
| 6,869,346 B2 | 3/2005 | Wendt et al. |
| 6,945,862 B2 | 9/2005 | Jasch et al. |
| 6,949,110 B2 | 9/2005 | Ark et al. |
| 6,968,933 B2 | 11/2005 | Buckhouse et al. |
| 7,001,403 B2 | 2/2006 | Hausmann et al. |
| 7,015,445 B2 | 3/2006 | Bishop |
| 7,077,735 B2 | 7/2006 | Krondorfer et al. |
| 7,093,668 B2 | 8/2006 | Gass et al. |
| 7,107,691 B2 | 9/2006 | Nottingham et al. |
| 7,115,027 B2 | 10/2006 | Thomaschewski |
| 7,121,358 B2 | 10/2006 | Gass et al. |
| 7,128,503 B2 | 10/2006 | Steadings et al. |
| 7,169,025 B2 | 1/2007 | Schumacher |
| 7,175,625 B2 | 2/2007 | Culbert |
| 7,189,239 B2 | 3/2007 | Fisher et al. |
| 7,207,873 B2 | 4/2007 | Hesse et al. |
| 7,217,177 B2 | 5/2007 | Frech et al. |
| D544,007 S | 6/2007 | Marasco |
| 7,225,714 B2 | 6/2007 | Rompel et al. |
| 7,237,988 B2 | 7/2007 | Steadings et al. |
| 7,258,351 B2 | 8/2007 | Hoffmann et al. |
| 7,258,515 B2 | 8/2007 | Krondorfer |
| 7,328,752 B2 | 2/2008 | Gass et al. |
| 7,334,511 B2 | 2/2008 | Hesselberg et al. |
| D563,186 S | 3/2008 | Ahn |
| 7,344,435 B2 | 3/2008 | Pollak et al. |
| 7,447,565 B2 | 11/2008 | Cerwin |
| 7,478,979 B2 | 1/2009 | Zhou et al. |
| 7,481,608 B2 | 1/2009 | Zhou et al. |

(56) References Cited

U.S. PATENT DOCUMENTS

| | | | |
|---|---|---|---|
| 7,497,860 B2 | 3/2009 | Carusillo et al. |
| 7,527,628 B2 | 5/2009 | Fletcher et al. |
| 7,533,470 B2 | 5/2009 | Nottingham et al. |
| 7,537,065 B2 | 5/2009 | Gallagher et al. |
| 7,540,334 B2 | 6/2009 | Gass et al. |
| 7,690,871 B2 | 4/2010 | Steadings et al. |
| 7,699,566 B2 | 4/2010 | Nickels, Jr. et al. |
| 7,717,191 B2 | 5/2010 | Trautner |
| 7,717,192 B2 | 5/2010 | Schroeder et al. |
| 7,726,917 B2 | 6/2010 | Mack |
| 7,735,575 B2 | 6/2010 | Trautner |
| 7,746,448 B2 | 6/2010 | Franitza et al. |
| D619,152 S | 7/2010 | Evatt et al. |
| 7,753,381 B2 | 7/2010 | Nickels, Jr. et al. |
| 7,762,349 B2 | 7/2010 | Trautner et al. |
| 7,784,166 B2 | 8/2010 | Tanner |
| D623,034 S | 9/2010 | Evatt et al. |
| 7,798,245 B2 | 9/2010 | Trautner |
| 7,833,241 B2 | 11/2010 | Gant |
| 7,841,601 B2 | 11/2010 | Mack |
| 7,854,274 B2 | 12/2010 | Trautner et al. |
| D633,769 S | 3/2011 | Evatt et al. |
| D633,928 S | 3/2011 | Nilsson et al. |
| 7,901,424 B2 | 3/2011 | Fletcher et al. |
| 7,950,152 B2 | 5/2011 | Gallego |
| 7,976,253 B2 | 7/2011 | Steadings et al. |
| 7,987,920 B2 | 8/2011 | Schroeder et al. |
| 7,997,586 B2 | 8/2011 | Ziegler et al. |
| D646,539 S | 10/2011 | Maras |
| D646,540 S | 10/2011 | Maras |
| D646,542 S | 10/2011 | Wackwitz |
| 8,038,156 B2 | 10/2011 | Nickels, Jr. et al. |
| D648,762 S | 11/2011 | Mack |
| 8,047,100 B2 | 11/2011 | King |
| D651,062 S | 12/2011 | Wackwitz |
| 8,070,168 B2 | 12/2011 | Mack |
| 8,082,671 B2 | 12/2011 | Saegesser |
| D651,499 S | 1/2012 | Tong |
| D651,874 S | 1/2012 | Davidian et al. |
| D651,875 S | 1/2012 | Davidian et al. |
| D651,876 S | 1/2012 | Davidian et al. |
| D651,877 S | 1/2012 | Davidian et al. |
| D651,878 S | 1/2012 | Davidian et al. |
| D652,274 S | 1/2012 | Davidian et al. |
| D653,523 S | 2/2012 | Wackwitz et al. |
| 8,109,343 B2 | 2/2012 | Schroeder et al. |
| 8,113,520 B2 | 2/2012 | Zaiser et al. |
| 8,151,679 B2 | 4/2012 | Bohne |
| D665,242 S | 8/2012 | Wackwitz |
| D682,651 S | 5/2013 | McRoberts et al. |
| D682,652 S | 5/2013 | McRoberts et al. |
| D693,193 S | 11/2013 | Bozic |
| D694,077 S | 11/2013 | Bozic |
| D694,596 S | 12/2013 | Davidian et al. |
| D694,597 S | 12/2013 | Davidian et al. |
| D694,598 S | 12/2013 | Davidian et al. |
| D706,595 S | 6/2014 | Kaye et al. |
| 8,925,931 B2 * | 1/2015 | Sergyeyenko et al. ........ 279/141 |
| 2001/0041524 A1 | 11/2001 | Steiger et al. |
| 2002/0104421 A1 | 8/2002 | Wurst |
| 2002/0116023 A1 | 8/2002 | Fletcher et al. |
| 2002/0198556 A1 | 12/2002 | Ark et al. |
| 2003/0014067 A1 | 1/2003 | Kullmer et al. |
| 2003/0032971 A1 | 2/2003 | Hausmann et al. |
| 2004/0098000 A1 | 5/2004 | Kleinwaechter |
| 2004/0138668 A1 | 7/2004 | Fisher et al. |
| 2004/0204731 A1 | 10/2004 | Gant |
| 2004/0243136 A1 | 12/2004 | Gupta et al. |
| 2005/0178261 A1 | 8/2005 | Thomaschewski |
| 2005/0245935 A1 | 11/2005 | Casey et al. |
| 2006/0150428 A1 | 7/2006 | Baculy |
| 2006/0172669 A1 | 8/2006 | Hesse et al. |
| 2006/0217048 A1 | 9/2006 | Frech et al. |
| 2006/0272468 A1 | 12/2006 | Gupta et al. |
| 2006/0282108 A1 | 12/2006 | Tanner |
| 2007/0060030 A1 | 3/2007 | Pollak et al. |
| 2007/0093190 A1 | 4/2007 | Schomisch |
| 2007/0229853 A1 | 10/2007 | Cheng |
| 2007/0266837 A1 | 11/2007 | Nickels et al. |
| 2007/0295156 A1 | 12/2007 | Ziegler et al. |
| 2007/0295165 A1 | 12/2007 | Tanaka et al. |
| 2008/0027449 A1 * | 1/2008 | Gundlapalli et al. ........... 606/82 |
| 2008/0190259 A1 | 8/2008 | Bohne |
| 2008/0196911 A1 | 8/2008 | Krapf et al. |
| 2009/0013540 A1 | 1/2009 | Bohne |
| 2009/0023371 A1 | 1/2009 | Blickle et al. |
| 2009/0051094 A1 | 2/2009 | Sandmeier |
| 2009/0093815 A1 | 4/2009 | Fletcher et al. |
| 2009/0138017 A1 | 5/2009 | Carusillo et al. |
| 2009/0197514 A1 | 8/2009 | Peisert |
| 2009/0198465 A1 | 8/2009 | Decker et al. |
| 2009/0277022 A1 | 11/2009 | Limberg et al. |
| 2009/0312761 A1 | 12/2009 | Boykin et al. |
| 2009/0312762 A1 | 12/2009 | Boykin |
| 2009/0312779 A1 | 12/2009 | Boykin et al. |
| 2009/0318065 A1 | 12/2009 | Zaiser et al. |
| 2009/0320625 A1 | 12/2009 | Kildevaeld |
| 2009/0321625 A1 | 12/2009 | Sieradzki et al. |
| 2010/0003906 A1 | 1/2010 | Zaiser et al. |
| 2010/0009613 A1 | 1/2010 | Frueh |
| 2010/0052269 A1 | 3/2010 | Zaiser et al. |
| 2010/0056029 A1 | 3/2010 | Grunikiewicz |
| 2010/0193207 A1 | 8/2010 | Mok et al. |
| 2010/0197208 A1 | 8/2010 | Blickle et al. |
| 2010/0288099 A1 | 11/2010 | Steiger |
| 2010/0300714 A1 | 12/2010 | Trautner |
| 2011/0000690 A1 | 1/2011 | Kildevaeld |
| 2011/0011605 A1 | 1/2011 | Kildevaeld |
| 2011/0067894 A1 | 3/2011 | Bernardi |
| 2011/0072946 A1 | 3/2011 | Bernardi et al. |
| 2011/0086582 A1 | 4/2011 | Takemura et al. |
| 2011/0097978 A1 | 4/2011 | Hofmann et al. |
| 2011/0127731 A1 | 6/2011 | Woecht et al. |
| 2011/0139472 A1 | 6/2011 | Bohne |
| 2011/0147023 A1 | 6/2011 | Herr |
| 2011/0227300 A1 | 9/2011 | Zhang et al. |
| 2011/0266757 A1 | 11/2011 | Steadings et al. |
| 2011/0266758 A1 | 11/2011 | Sergyeyenko et al. |
| 2011/0266759 A1 | 11/2011 | Goldman |
| 2011/0291368 A1 | 12/2011 | Chen et al. |
| 2011/0309589 A1 | 12/2011 | Maras |
| 2011/0315414 A1 | 12/2011 | Kuntner et al. |
| 2011/0316241 A1 | 12/2011 | Zhang et al. |
| 2011/0316242 A1 | 12/2011 | Zhang et al. |
| 2012/0025476 A1 | 2/2012 | Nickels, Jr. et al. |
| 2012/0031636 A1 | 2/2012 | King |
| 2012/0073410 A1 | 3/2012 | Hoffman et al. |
| 2012/0090863 A1 | 4/2012 | Puzio et al. |
| 2012/0144971 A1 | 6/2012 | Bohne |
| 2012/0169018 A1 | 7/2012 | Lu et al. |
| 2014/0252729 A1 | 9/2014 | Xu |
| 2014/0299345 A1 | 10/2014 | McRoberts et al. |
| 2014/0325855 A1 | 11/2014 | Bozic |

FOREIGN PATENT DOCUMENTS

| | | |
|---|---|---|
| DE | 1878647 U | 8/1963 |
| DE | 2915292 A1 | 10/1980 |
| DE | 2935731 A1 | 4/1981 |
| DE | 3203670 A1 | 8/1983 |
| DE | 3520417 A1 | 12/1985 |
| DE | 3833735 A1 | 4/1989 |
| DE | 8618695 U1 | 9/1989 |
| DE | 4036904 C1 | 5/1992 |
| DE | 29607061 U1 | 10/1996 |
| DE | 29810157 U1 | 8/1998 |
| DE | 19736933 C1 | 10/1998 |
| DE | 29907671 U1 | 8/1999 |
| DE | 29809788 U1 | 9/1999 |
| DE | 19825408 A1 | 12/1999 |
| DE | 20303018 U1 | 4/2003 |
| DE | 10231393 A1 | 1/2004 |
| DE | 10307840 B3 | 6/2004 |
| DE | 10325392 A1 | 12/2004 |

(56) References Cited

FOREIGN PATENT DOCUMENTS

| | | | |
|---|---|---|---|
| DE | 102004020982 A1 | 11/2005 |
| DE | 202006001643 U1 | 3/2006 |
| DE | 102004050799 A1 | 4/2006 |
| DE | 102007018465 A1 | 10/2008 |
| DE | 102007018467 A1 | 10/2008 |
| DE | 202009004549 U1 | 6/2009 |
| DE | 202008001759 U1 | 7/2009 |
| DE | 102008001234 A1 | 10/2009 |
| DE | 202009013147 U1 | 1/2010 |
| DE | 202008011959 U1 | 2/2010 |
| DE | 102009030854 A1 | 1/2011 |
| EP | 0443362 A2 | 8/1991 |
| EP | 0554929 A1 | 8/1993 |
| EP | 0695607 A1 | 2/1996 |
| EP | 0776634 A2 | 6/1997 |
| EP | 0962283 A1 | 12/1999 |
| EP | 1694477 A1 | 6/2005 |
| EP | 1687120 A1 | 8/2006 |
| EP | 1819490 A1 | 8/2007 |
| EP | 1852218 A1 | 11/2007 |
| EP | 1882538 A2 | 1/2008 |
| EP | 2085182 A1 | 8/2009 |
| EP | 2143531 A1 | 1/2010 |
| EP | 2152475 A1 | 2/2010 |
| EP | 2159000 A1 | 3/2010 |
| JP | 1158205 A | 6/1989 |
| JP | 2006263914 A | 10/2006 |
| WO | WO-9424945 A1 | 11/1994 |
| WO | WO-03097299 A1 | 11/2003 |
| WO | WO-2004043269 A1 | 5/2004 |
| WO | WO-2005056256 A1 | 6/2005 |
| WO | WO-2006017066 A2 | 2/2006 |
| WO | WO-2008151866 A1 | 12/2008 |
| WO | WO-2009151958 A2 | 12/2009 |
| WO | WO-2009151959 A1 | 12/2009 |
| WO | WO-2009151965 A1 | 12/2009 |
| WO | WO-2010020458 A1 | 2/2010 |
| WO | WO 2013067960 A1 * | 5/2013 |
| WO | 2013012126 | 7/2013 |

OTHER PUBLICATIONS

Zimmer, Inc., Brochure "More Versatile 'Graft' Blades Available" dated Feb. 15, 1993, 2 pages; © 1993 Zimmer, Inc.

Materials from Stryker Corporation Brochure published prior to Jan. 1, 1994.

Aloe Medical Instruments "Gall Ball Retractor" Item B-1323, p. 115 © 1965.

Stryker Maintenance Manual entitled "System II OrthoPower 90 Battery Powered Surgical Instruments"—For Use With: 298-92, 94,96, 98 (Stryker Surgical Brochure 298-92-16 Rev (Mar. 1986).

Sketch a related to p. 9 of the Stryker Maintenance Manual entitled "System II OrthoPower 90 Battery Powered Surgical Instruments" (Mar. 1986).

pp. 2, 3 and 5 of Stryker prior art brochure/-catalog No. 1420 Standard Bone Saw Handpiece, 1100 Series saw blades, and No. 1470 Sagittal Plane bone saw with Series 1370 blades.

Hall Surgical brochure—New Opposed-Tooth Blades—published prior to Jan. 1, 1994.

Dewaele, Karl—European Search Report—Jun. 20, 2014—7 pages—The Hague.

O'Connell, Wayne—Patent Examination Report No. 3 re Australian Patent Application No. 2011201633—Oct. 2, 2014—6 pages—Woden ACT, Canberra, Australia.

Dremel 6300-05 120-volt Multi-Max Oscillating Kit (retrieved on Sep. 30, 2014) viewed on the internet. https://web.archive.org/web/20091224220316/http://www.amazon.com/Dremel-6300-05-120-Volt-Multi-Max-Oscillating/dp/B002WTCDXO published on Dec. 24, 2009 as per Wayback Machine.

* cited by examiner

UNIVERSAL ACCESSORY FOR OSCILLATING POWER TOOL

CROSS REFERENCE TO RELATED APPLICATIONS

This application is related to U.S. Provisional Patent Application No. 61/664,454, filed on Jun. 26, 2012 and U.S. Provisional Patent Application No. 61/622,894 filed Apr. 11, 2012, which are continuation-in-parts of U.S. patent application Ser. No. 13/362,637 filed on Jan. 31, 2012, which is a continuation-in-part of U.S. patent application Ser. No. 12/942,098 filed on Nov. 9, 2010, which claims the benefit and priority of U.S. Provisional Patent Application No. 61/329,480, filed Apr. 29, 2010. The entire disclosures of the above applications are incorporated herein by reference.

TECHNICAL FIELD

This application relates to accessories (such as cutting tools, saw blades, and sanding tools) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. Different brands of oscillating power tools tend to have different, often proprietary, accessory attachment mechanisms. It is desirable to have oscillating accessories with a universal attachment portion that can be attached to a multitude of different brands of oscillating power tools.

SUMMARY

In an aspect, an accessory for coupling to an attachment mechanism of an oscillating power tool includes a working end, an opposite rear end, and a a fitment portion adjacent the rear end. The fitment portion comprises a plurality of openings configured to receive projections on the attachment mechanisms of each of the Porter-Cable®, Mastercraft®, Dremel®, Bosch®, Milwaukee®, Skil®, Fein®, Craftsman®, and Ridgid® branded oscillating power tools.

The plurality of openings include a generally U-shaped opening that is open at the rear end, a first set of openings in communication with and extending radially outward from the U-shaped opening, a second set of openings not in communication with and positioned radially outward from the U-shaped opening, and a third set of openings adjacent the rear end. The U-shaped opening is configured to receive a post of a Porter-Cable® branded oscillating power tool, and a central projection a Fein®, a Ridgid®, and a Mastercraft® branded oscillating power tool. The first set of openings is configured to receive round projections of Porter-Cable® branded oscillating power tools, round projections of Master-craft® banded oscillating power tools, oblong projections of Dremel®, Bosch®, Milwaukee®, and Skil® branded oscillating power tools, radial projections Fein® branded oscillating power tools, radial projections of Craftsman® branded oscillating power tools, and radial projections of Ridgid® branded oscillating power tools. The second set of openings is configured to receive round projections of Porter-Cable® branded power tools, and oblong projections of Dremel®, Bosch®, Milwaukee®, and Skil® branded power tools. The third set of recesses is configured to receive round projections of Porter-Cable® branded oscillating power tools, and oblong projections of Dremel®, Bosch®, Milwaukee®, and Skil® branded oscillating power tools.

The first set of openings may include radial arm slots at 90, 180, and 270 degrees. The second set of openings may include arc-shaped slots between pairs of openings the first set of openings. Alternatively, the second set of openings may include radial slots not connected with the U-shaped opening. The third set of openings may include notches in the rear end. Alternatively, the third set of openings may include notches formed in the U-shaped slot. In another alternative, the third set of openings may include chamfers tapering outward from the U-shaped opening to the rear end.

Advantages may include being able to couple the accessories to numerous different brands and configurations of oscillating power tools, including, but not limited to Cable®, Mastercraft®, Dremel®, Bosch®, Milwaukee®, Skil®, Fein®, Craftsman®, and Ridgid® branded oscillating power tools. Other advantages and features will be apparent from the description and the drawings.

DETAILED DESCRIPTION

Figure 1A:
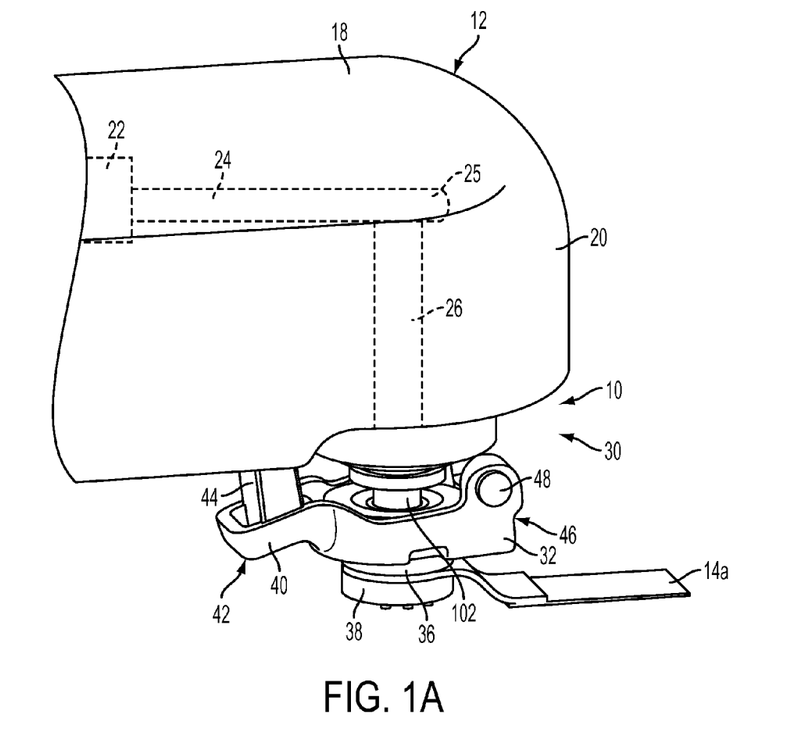
FIG. 1A is a perspective view of one brand of oscillating power tool.

Referring to FIG. 1, an oscillating power tool 12 generally includes a tool body 18 including a housing 20 that generally contains a motor 22 that drives an output member 24. The output member 24 can be coupled to a spindle 26 via a transmission 25 that converts rotary motion of the output member 24 to oscillating motion of the spindle 26. The output of the spindle 26 is coupled to an accessory attachment mechanism in the form of a clamp arrangement 10. The clamp arrangement 10 includes a clamp assembly 30 that operatively cooperates with an actuator such as a lever 32. The clamp assembly 30 can generally include a first clamp member 36 and a second clamp member 38. The lever 32 can include a lever arm 40 that includes a user engagement portion 42 and a block 44. The lever 32 can further include a pivot portion 46 having a pivot axle 48.

Figure 1B:
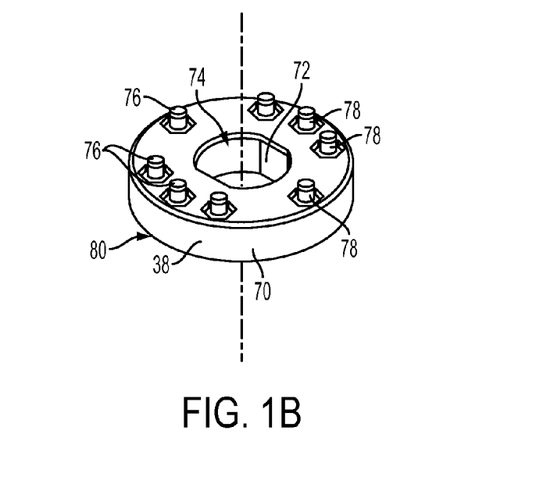
FIG. 1B is a perspective view of an accessory attachment mechanism for the oscillating power tool of FIG. 1A.

Referring also to FIG. 1B, the second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male protrusions 78. In the particular example shown, eight protrusions each having a circular cross section and a tapered shape or form are provided. An oscillating accessory 14a (in this case a saw blade) is removably clamped between the first and second clamp members 36, 38, and includes a plurality of openings that receive the male protrusions 78 so as to inhibit rotation of the oscillating accessory 14a relative to the clamp members 36, 38.

Figure 2A:
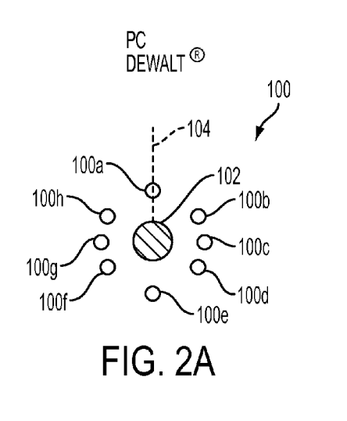
FIGS. 2A-2F are schematic views of accessory attachment mechanisms for various brands of oscillating power tools.
Figure 2B:
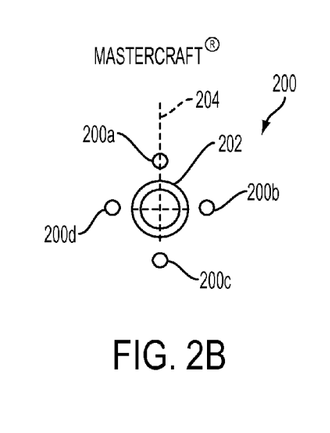
Figure 2C:
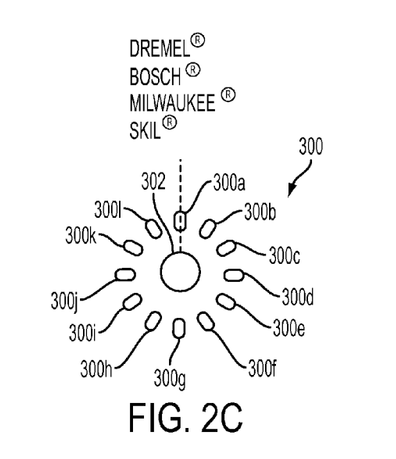

Referring to FIGS. 2A-2F, different brands of oscillating power tools have accessory attachment mechanisms with different patterns of projections for engaging openings in an accessory. FIG. 2A illustrates a projection pattern 100 on Porter-Cable® branded oscillating power tools, which includes eight round projections 100a-100h arranged clockwise about a support post 102 for the clamping mechanism at angles of 0, 60, 90, 120, 180, 240, 270, and 300 degrees, respectively, relative to an imaginary vertical line 104 extending from the central hole 102 through the projection 100a. FIG. 2B illustrates a projection pattern 200 on Mastercraft® branded oscillating power tools, which includes four round projections 200a-200d arranged clockwise about a central circular projection 202 at angles of 0, 90, 180, and 270 degrees, respectively, relative to an imaginary vertical line 204 extending from the central projection 202 through the projection 200a. FIG. 2C illustrates a projection pattern 300 on Dremel®, Bosch®, Milwaukee®, and Skil® branded oscillating power tools, which includes twelve oblong projections 300a-300l arranged clockwise about a central point 302 at angles of 0, 30, 60, 90, 120, 150, 180, 210, 240, 270, 300, and 330 degrees, respectively, relative to an imaginary vertical line 204 extending from the central point 302 through the projection 300a.

Figure 2D:
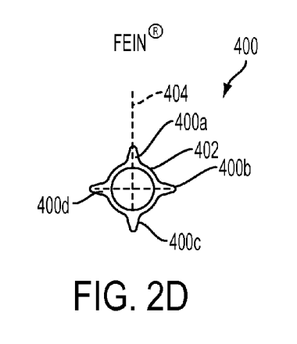
Figure 2E:
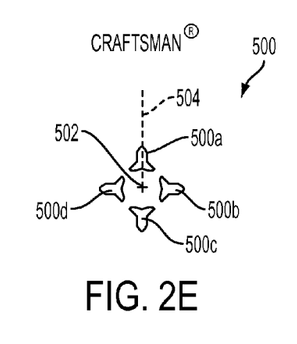
Figure 2F:
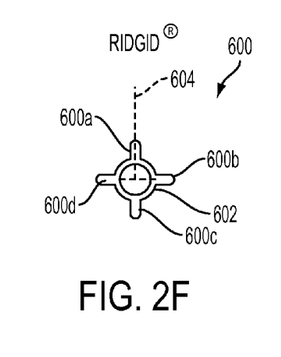
Figure 3A:
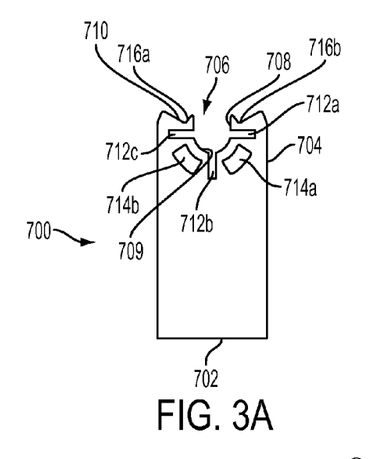
FIG. 3 illustrates a first embodiment of a universal accessory attachment mechanism, showing how the accessory fits to the accessory attachment mechanisms of FIGS. 2A-2F.
Figures 3B, 3C:
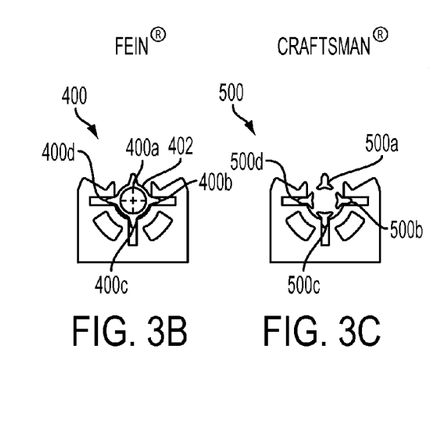
Figure 3D:
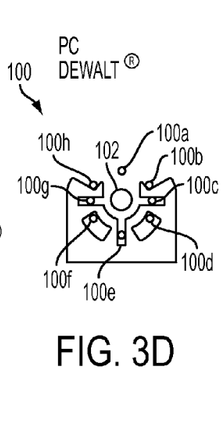
Figure 3E:
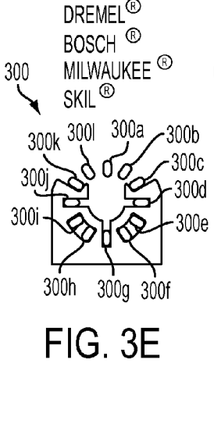
Figure 3F:
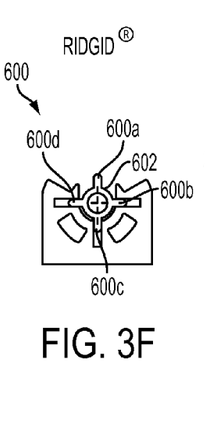
Figure 3G:
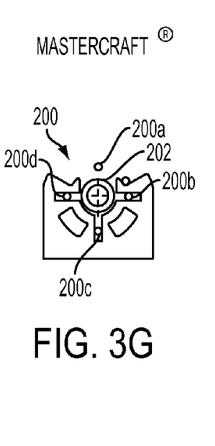
Figure 4A:
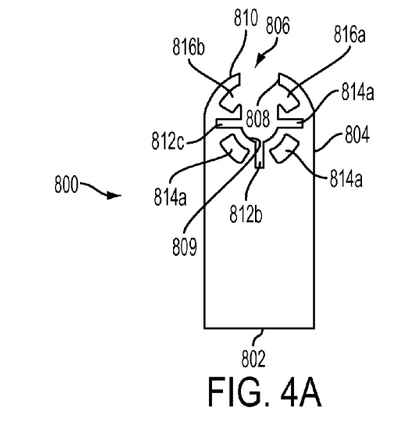
FIG. 4 illustrates a second embodiment of a universal accessory attachment mechanism, showing how the accessory fits to the accessory attachment mechanisms of FIGS. 2A-2F.
Figure 4B:
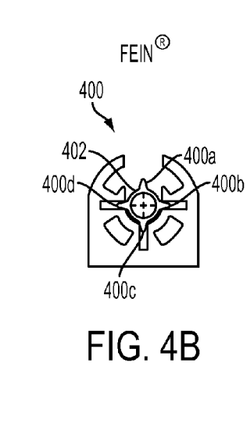
Figure 4C:
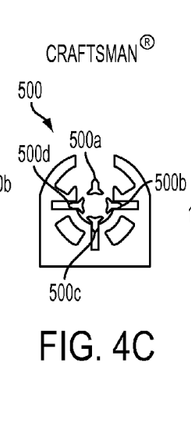
Figure 4D:
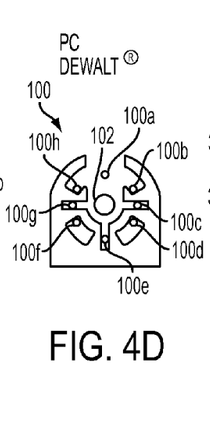
Figure 4E:
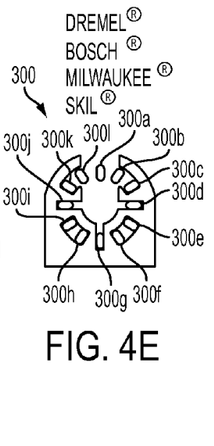
Figure 4F:
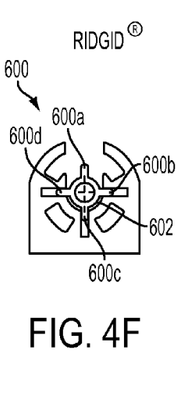
Figure 4G:
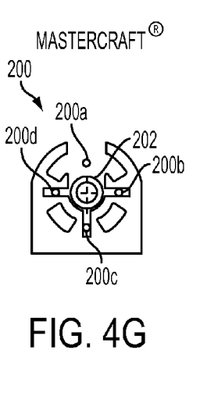
Figure 5A:
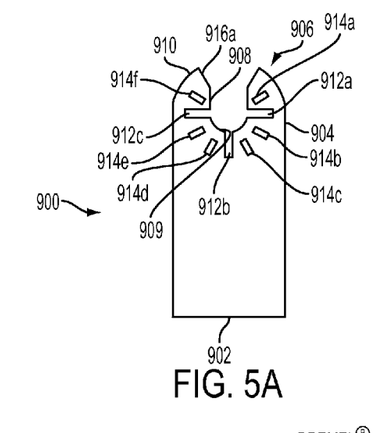
FIG. 5 illustrates a third embodiment of a universal accessory attachment mechanism, showing how the accessory fits to the accessory attachment mechanisms of FIGS. 2A-2F.
Figure 5B:
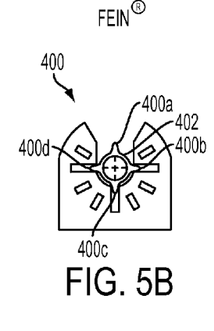
Figure 5C:
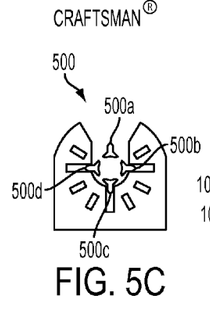
Figure 5D:
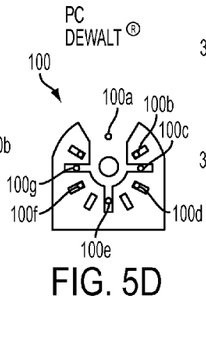
Figure 5E:
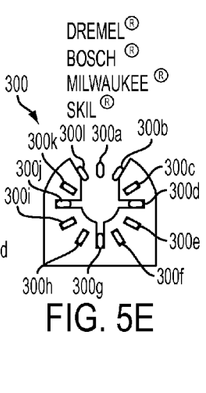
Figure 5F:
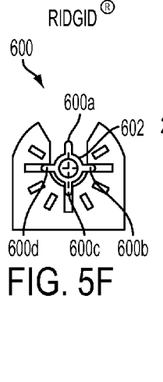
Figure 5G:
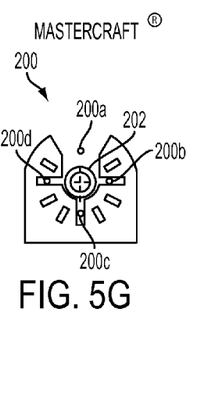
Figure 6A:
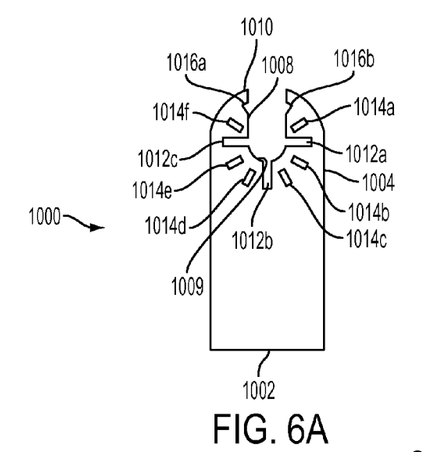
FIG. 6 illustrates a fourth embodiment of a universal accessory attachment mechanism, showing how the accessory fits to the accessory attachment mechanisms of FIGS. 2A-2F.
Figure 6B:
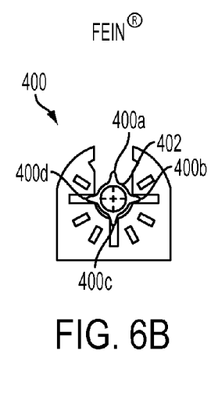
Figure 6C:
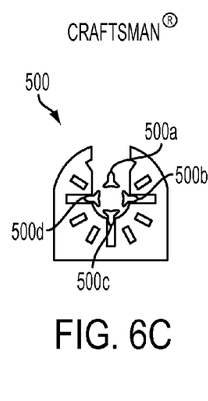
Figure 6D:
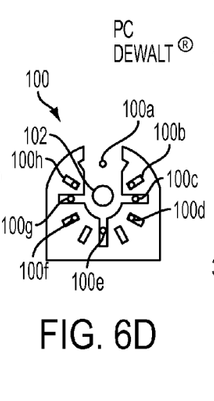
Figure 6E:
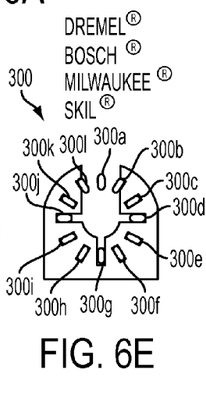
Figure 6F:
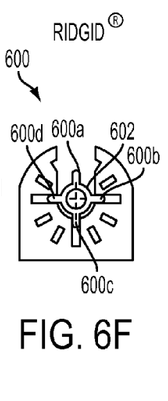
Figure 6G:
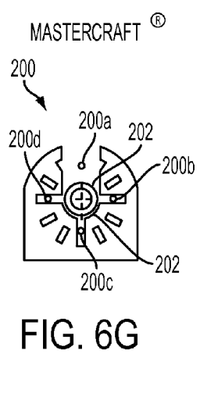

FIG. 2D illustrates a projection pattern 400 on Fein® branded oscillating power tools, which includes a central, circular projection 402, and four radial projections 400a-400d extending radially outward from the central projection 402 clockwise at angles of 0, 90, 180, and 270 degrees, respectively, relative to an imaginary vertical line 404 extending from the central projection 402 through the radial projection 400a. FIG. 2E illustrates a projection pattern 500 on Craftsman® branded oscillating power tools, which includes a four radial projections 500a-500d extending radially outward, and arranged clockwise about a central point 502 at angles of 0, 90, 180, and 270 degrees, respectively, relative to an imaginary vertical line 504 extending from the central point 502 through the radial projection 500a. FIG. 2F illustrates a projection pattern 600 on Ridgid® branded oscillating power tools, which includes a central, circular projection 602, and four radial projections 600a-600d extending radially outward from the central projection 602 clockwise at angles of 0, 90, 180, and 270 degrees, respectively, relative to an imaginary vertical line 604 extending from the central projection 602 through the radial projection 600a.

Referring to FIG. 3, a first embodiment of an oscillating accessory 700 includes a working end 702 and a rear end 704. The rear end 704 has a fitment portion having a plurality of openings 706 configured to couple the accessory 700 to each of the projection patterns illustrated in FIGS. 2A-2F. The openings 706 include a generally U-shaped opening 708 extending from a rear end portion 710 of the accessory 700. Three radial openings 712a-712c are in communication with and extend radially outward from the U-shaped opening 708 at 90, 180, and 270 degree positions. A pair of arc-shaped openings 714a, 714b each are not in communication with the U-shaped opening, and are disposed between adjacent pairs of the radial openings 712a, 712b, and 712b, 712c, respectively. The rear end portion 710 includes a pair of notches 716a, 716b adjacent to the U-shaped opening 708.

The U-shaped opening 708 is opened at the rear end portion 710 in order to be able to receive the support post 102 of the Porter-Cable® branded power tool. The U-shaped opening 708 is also configured to receive the central projections 202, 402, and 602 of the Fein®, Ridgid®, and Mastercraft® branded power tools, respectively. The radial openings 712a-712c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The arc-shaped openings 714a, 714b are configured to receive the round projections 100d, 100f of the Porter-Cable® branded power tools, and the oblong projections 300e, 300f, 300h, 300i of the Dremel®, Bosch®, Milwaukee®, and Skil® branded power tools. The notches 716a, 716b are configured to receive the round projections 100b, 100h of the Porter-Cable® branded power tools, and the oblong projections 300c, 300k of the Dremel®, Bosch®, Milwaukee®, and Skil® branded power tools. In this manner, the openings 700 can universally engage the attachment mechanism of any of the aforementioned oscillating power tools.

Referring to FIG. 4, a second embodiment of an oscillating accessory 800 includes a working end 802 and a rear end 804. The rear end 804 has a fitment with a plurality of openings 806 configured to couple the accessory 800 to each of the projection patterns illustrated in FIGS. 2A-2F. The openings 806 include a generally U-shaped opening 808 extending from a rear end portion 810 of the accessory 800. Three radial openings 812a-812c are in communication with and extend radially outward from the U-shaped opening 808 at 90, 180, and 270 degree positions. A first pair of arc-shaped openings 814a, 814b are not in communication with the U-shaped opening and each are disposed between adjacent pairs of the radial openings 812a, 812b, and 812b, 812c, respectively. A second pair of arc-shaped openings 816a, 816b extend circumferentially from the U-shaped opening 808 toward the radial openings 812c, 812a, respectively.

The U-shaped opening 808 is opened at the rear end portion 810 in order to be able to receive the support post 102 of the Porter-Cable® branded power tool. The U-shaped opening 808 is also configured to receive the central projections 202, 402, and 602 of the Fein®, Ridgid®, and Mastercraft® branded power tools, respectively. The radial openings 812a-812c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The first set of arc-shaped openings 814a, 814b are configured to receive the round projections 100d, 100f of the Porter-Cable® branded power tools, and the oblong projections 300e, 300f, 300h, 300i of the Dremel®, Bosch®, Milwaukee®, and Skil® branded power tools. The second set of arc-shaped openings 816a, 816b are configured to receive the round projections 100b, 100h of the Porter-Cable® branded power tools, and the oblong projections 300c, 300k of the Dremel®, Bosch®, Milwaukee®, and Skil® branded power tools. In this manner, the openings 800 can universally engage the attachment mechanism of any of the aforementioned oscillating power tools.

Referring to FIG. 5, a third embodiment of an oscillating accessory 900 includes a working end 902 and a rear end 904. The rear end 904 has a fitment with a plurality of openings 906 configured to couple the accessory 900 to each of the projection patterns illustrated in FIGS. 2A-2F. The openings 906 include a generally U-shaped opening 908 extending from a rear end portion 910 of the accessory 900. A first set of three radial openings 912a-912c are in communication with and and extend radially outward from the U-shaped opening 908 at 90, 180, and 270 degree positions. A second set of six radial openings 914a-914e extend radially outward, but are not in communication with, the U-shaped opening 908 at 60, 120, 150, 210, 240, and 300 degree positions. A pair of chamfers 916a, 916b are taper outward from the U-shaped opening 908 to the rear end portion 910 of the accessory 900.

The U-shaped opening 908 is opened at the rear end portion 910 in order to be able to receive the support post 102 of the Porter-Cable® branded power tool. The U-shaped opening 908 is also configured to receive the central projections 202, 402, and 602 of the Fein®, Ridgid®, and Mastercraft® branded power tools, respectively. The first set of radial openings 912a-912c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The second set of radial openings 914a-914e are configured to receive the round projections 100b, 100d, 100f, 100h of the Porter-Cable® branded power tools, and the oblong projections 300c, 300e, 300f, 300h, 300i, 300k of the Dremel®, Bosch®, Milwaukee®, and Skil® branded power tools. The chamfers 916a, 916b are configured to receive and provide clearance for the oblong projections 300b, 300l of the Dremel®, Bosch®, Milwaukee®, and Skil® branded power tools. In this manner, the openings 900 can universally engage the attachment mechanism of any of the aforementioned oscillating power tools.

Referring to FIG. 6, a fourth embodiment of an oscillating accessory 1000 includes a working end 1002 and a rear end 1004. The rear end 1004 has a fitment with a plurality of openings 1006 configured to couple the accessory 1000 to each of the projection patterns illustrated in FIGS. 2A-2F. The openings 1006 include a generally U-shaped opening 1008 extending from a rear end portion 1010 of the accessory 1000. A first set of three radial openings 1012a-1012c are in communication with and extend radially outward from the U-shaped opening 1008 at 90, 180, and 270 degree positions. A second set of six radial openings 1014a-1014e extend radially outward, but are not in communication with, the U-shaped opening 908 at 60, 120, 150, 210, 240, and 300 degree positions. A pair of notches 1016a, 1016b are formed in the U-shaped opening 1008 at 30 and 330 degree positions.

The U-shaped opening 1008 is opened at the rear end portion 1010 in order to be able to receive the support post 102 of the Porter-Cable® branded power tool. The U-shaped opening 1008 is also configured to receive the central projections 202, 402, and 602 of the Fein®, Ridgid®, and Mastercraft® branded power tools, respectively. The first set of radial openings 1012a-1012c are configured to receive the round projections 100c, 100e, 100g of the Porter-Cable® branded power tools, the round projections 200b, 200c, 200d of the Mastercraft® banded power tools, the oblong projections 300d, 300g, 300j of the Dremel®, Bosch®, Milwaukee®, and Skil® branded power tools, the radial projections 400b-400d of the Fein® branded power tools, the radial projections 500b-500d of the Craftsman® branded power tools, and the radial projections 600b-600d of the Ridgid® branded power tools. The second set of radial openings 1014a-1014e are configured to receive the round projections 100b, 100d, 100f, 100h of the Porter-Cable® branded power tools, and the oblong projections 300c, 300e, 300f, 300h, 300i, 300k of the Dremel®, Bosch®, Milwaukee®, and Skil® branded power tools. The notches 1016a, 1016b are configured to receive the oblong projections 300b, 300l of the Dremel®, Bosch®, Milwaukee®, and Skil® branded power tools. In this manner, the openings 1000 can universally engage the attachment mechanism of any of the aforementioned oscillating power tools.

Numerous modifications may be made to the exemplary implementations described above. For example, the shapes and configurations of the openings could be modified, or the openings could be made as recesses. The oscillating accessory may be any type of accessory used with oscillating tool such as a cutting tool, a saw blade, or a sanding or abrading tool. These and other implementations are within the scope of this application.

The invention claimed is:

1. A combination kit comprising:
an oscillating power tool comprising a housing, a motor disposed in the housing, a transmission coupled to the motor and configured to convert a rotational motion at an input portion to an oscillating motion at an output portion, and an accessory attachment mechanism coupled to the output portion and having a clamping face with at least one projection and a central post; and
an accessory comprising a working end portion and an opposite rear end portion configured to be removably coupled to the attachment mechanism, the rear end portion including: (a) a generally U-shaped opening open to the rear end portion, the U-shaped opening having a central portion configured to receive the central post and a rearward portion in communication with the central portion and open to the rear end portion of the accessory; (b) a first plurality of openings in communication with and extending radially outward from the central opening, the first plurality of openings including a first radial arm slot extending from the central portion at approximately 90 degrees to the U-shaped opening, a second radial arm slot extending from the central portion at approximately 180 degrees to the U-shaped opening, and a third radial arm slot extending from the central portion at approximately 270 degrees from the U-shaped opening; and (c) a second plurality of openings not in communication with and positioned radially outward from the central opening with each of the second plurality of openings having a substantially rectangular shape defined by a pair of substantially straight elongated sidewalls and a pair of substantially straight end walls, wherein at least one of the first plurality of openings or at least one of the second plurality of openings is configured to receive the at least one projection.

2. The kit of claim 1 wherein the working end portion comprises at least one of a cutting edge, a saw blade, a sanding surface, and an abrading surface.

3. The kit of claim 1, wherein the generally U-shaped opening comprises a pair of parallel side edges.

4. The kit of claim 3, wherein the generally U-shaped opening further comprises a pair of non-parallel side edges tapering outwardly and rearwardly from the parallel side edges.

5. The kit of claim 4, wherein the non-parallel side edges define notches in the generally U-shaped opening.

6. The kit of claim 1, further comprising a notch defined in the generally U-shaped opening.

7. The kit of claim 1, wherein the second plurality of openings includes a first pair of radial openings spaced radially from the central portion and between the first and second radial arm slots, and a second pair of radial openings spaced radially from the central portion and between the second and third radial arm slots.

8. The kit of claim 7, wherein the first pair of radial openings are at angles of approximately 120 degrees and approximately 150 degrees relative to the U-shaped opening, and the second pair of radial openings are at angles of approximately 210 degrees and approximately 240 degrees relative to the U-shaped opening.

9. The kit of claim 7, wherein the second plurality of openings further includes a third radial opening spaced radially from the central portion between the first radial arm slot and the generally U-shaped opening, and a fourth radial opening spaced radially from the central portion between the third radial arm slot and the generally U-shaped opening.

10. The kit of claim 9, wherein the third radial opening is at an angle of approximately 60 degrees relative to the U-shaped opening, and the fourth radial opening is at an angle of approximately 300 degrees relative to the U-shaped opening.

11. The kit of claim 1, wherein the at least one projection comprises a plurality of projections configured to be received in at least one of the first plurality of openings.

12. The kit of claim 11, wherein the at least one projection further comprises a second plurality of projections configured to be received in at least one of the second plurality of openings.

13. The kit of claim 1, wherein the at least one projection comprises a plurality of projections configured to be received in at least one of the second plurality of openings.

14. The kit of claim 1, wherein at least one of the first and second plurality of openings are configured to removably receive a second projection of a second oscillating power tool, the second projection configured differently than the at least one projection.

15. The kit of claim 1, wherein, in each of the second plurality of openings, each adjacent elongated sidewall and end wall are joined by a rounded corner.

16. A combination kit comprising:
an oscillating power tool comprising a housing, a motor disposed in the housing, a transmission coupled to the motor and configured to convert a rotational motion at an input portion to an oscillating motion at an output portion, and an accessory attachment mechanism coupled to the output portion and having a clamping face with at least one projection and a central post; and
an accessory comprising a working end portion and an opposite rear end portion configured to be removably coupled to the attachment mechanism, the rear end portion including: (a) a generally U-shaped opening open to the rear end portion, the generally U-shaped opening having a central portion configured to receive the central post, a rearward portion with a pair of opposing side edges extending rearward from the central portion and open to the rear end portion of the accessory, and a notch defined in each of the side edges; (b) a first plurality of openings in communication with and extending radially outward from the central opening, the first plurality of openings including a first radial arm slot extending from the central portion at approximately 90 degrees to the U-shaped opening, a second radial arm slot extending from the central portion at approximately 180 degrees to the U-shaped opening, and a third radial arm slot extending from the central portion at approximately 270 degrees from the U-shaped opening; and (c) a second plurality of openings not in communication with and positioned radially outward from the central opening and circumferentially between adjacent openings in the second plurality of openings, wherein at least one of the first plurality of openings or at least one of the second plurality of openings is configured to receive the at least one projection.

17. The kit of claim 16, wherein the second plurality of openings includes a first radial opening circumferentially between the first and second radial arm slots, and a second radial opening circumferentially between the second and third radial arm slots.

18. The kit of claim 17, wherein the first radial opening is at an angle between approximately 120 degrees and approximately 150 degrees relative to the U-shaped opening, and the second radial opening is at an angle of approximately 210 degrees and approximately 240 degrees relative to the U-shaped opening.

19. The kit of claim 16, wherein the pair of opposing side edges are parallel.

20. The kit of claim 19, wherein the notches are defined by a pair of non-parallel side edges extending rearward of the parallel side edges.

\* \* \* \* \*